June 15, 1965

W. H. THOMPSON 3,188,996

HYDROSTATIC TRANSMISSION SYSTEM

Filed Aug. 22, 1961

INVENTOR
WILLIAM H. THOMPSON

BY Fisher, Christen and Goodson

ATTORNEYS

June 15, 1965 W. H. THOMPSON 3,188,996
HYDROSTATIC TRANSMISSION SYSTEM
Filed Aug. 22, 1961 6 Sheets-Sheet 6

INVENTOR
WILLIAM H. THOMPSON

BY *Fisher, Christen and Goodson*
ATTORNEYS

United States Patent Office 3,188,996
Patented June 15, 1965

3,188,996
HYDROSTATIC TRANSMISSION SYSTEM
William H. Thompson, Milwaukee, Wis., assignor to Applied Power Industries, Inc., Milwaukee, Wis., a corporation of Wisconsin
Filed Aug. 22, 1961, Ser. No. 133,169
8 Claims. (Cl. 115—1)

This invention relates to a hydraulic transmission system and in particular relates to a system having improved means for power transfer and utilization.

An important objective of this invention is providing a hydrostatic power transmission system for use with a vehicle having land and water propulsion capabilities.

Another objective of this invention is providing power to such propulsion systems simultaneously or alternately, as dictated by the particular load encountered.

A still further objective of the invention is to provide a vehicle with four-wheel drive in which the left front and right rear wheels are driven in series from one independent power output of the power source and, in which the right front and left rear wheels are driven by a separate and independent power output of a common power source. This method of wheel interconnection insures, at any one time, the probability of at least one wheel connected to the first of the independent power outputs and one wheel connected to the second of the independent power outputs, having traction and power provided thereto. This cross-connection of the wheels to independent power outputs insures that any two adjacent wheels in the vehicle will be connected to separate and independent power outputs. Thus, the vehicle will be able to convert nearly one hundred percent of its power output to useful traction under all operating conditions. For example, if the left side of the vehicle is operating on a high traction road surface and the right side of the vehicle in extremely low traction mud, the left front wheel, which is driven from a first of the aforementioned independent power outputs, would absorb nearly one hundred percent of the power available from this output, while the left rear wheel, which is connected to a second of the aforementioned independent power outputs, would absorb nearly one hundred percent of the power available from this last mentioned output. Similarly, if the front of the vehicle were operating in extremely low traction mud and the rear of the vehicle on a high traction surface, the right rear wheel, which is connected to the first of the aforementioned independent power outputs, would absorb nearly one hundred percent of the power from this output and the left rear wheel, which is connected to the second of the aforementioned independent power outputs, would absorb nearly one hundred percent of the power from this power output. Therefore, the criss-cross method of interconnection of wheels of this invention insures that, in the great majority of instances, the output of the engine is delivered to the wheels of the vehicle up to the maximum tractive ability of the wheels having the greatest tractive capability.

Another objective of the invention is to provide increased stability and steerability in a four-wheel drive hydrostatic system by transmitting power from a primary drive pump, first to the vehicle's front wheels, and subsequently to its rear wheel, such that a portion of the power is absorbed by the front wheels up to their maximum tractive capability. This tractive capability of the front wheels normally depends upon the grade and terrain being traversed. In this invention, if the front wheels are not capable of absorbing the full horsepower output of the primary drive pump, the balance of power is transferred to the rear wheels. A four-wheel drive, with the prime drive on the front wheels for considerations of stability and steerability on slopes as well as better tractive ability, is therefore an objective of this invention.

Another important objective of the invention is to provide means whereby the vehicle operator can divide the power output between the front wheels of the vehicle and the water propulsion unit in proportion to their demands with first satisfaction to the wheels. This means that an operator, when leaving a body of water, can maintain directional control and inertia through the use of the water propulsion unit while at the same time maintaining bank climbing ability through the ground engaging wheels. As the vehcle begins to leave the water, the front wheels carry more and more of the vehicle's weight and, as they reach firmer footing, absorb increasing amounts of the primary drive pump power until they eventually provide one hundred percent of the driving force. The vehicle's momentum will not be lost by requiring a stop at the water's edge, which certainly in most instances is of poor traction quality.

Another important objective of this invention is the provision of an auxiliary dynamic braking action within the power transmission system. This objective is obtained by converting the wheel driving motors to pumps and the pressure energy generated by the motors is dissipated as heat across a restrictor in the fluid lines. A portion of the back pressure developed across the restrictor is utilized to provide power for the fluid heat exchanger of the system.

A still further important objective of the invention is providing means whereby a vehicle operator can audibly determine and feel "lugging" when the vehicle approaches an overloaded condition. This objective is obtained with an increase in torque output, and with a slight loss in speed. As an adjunct to this objective a cut-out of this means is provided during marine operations.

Another important objective of the invention is the provision of a high pressure hydrostatic transmission system for a military vehicle, or other vehicle having critical space requirements, which has great flexibility in design and equipment location characteristics.

A very important objective of the system is the provision of means within the fluid controls for the hydraulic system load to match the diesel engine output. This permits maximum vehicle drive torque at stalled conditions and maximum vehicle speed at part load conditions for the particular engine speed range utilized, and, more specifically, it allows the hydraulic system to absorb the maximum torque output of the engine, but prevents it from exceeding the torque output of the engine and thus stalling the engine.

A still further objective of the invention is to provide wheels each driven by two hydraulic motors of different capacity and having valve controls whereby the motors may be individuallly or jointly selected to provide driving power to their associated wheel. In combination with this selectivity, the invention further provides a mechanical gear reduction within the wheel for use in conjunction with the hydraulic reduction. In this manner, a wide range of speeds is obtainable.

These and other objectives and advantages of the invention will become more apparent upon a reading of the following description of one system made in accordance with the invention as diagrammatically illustrated by way of example in the drawings, in which.

3

Figure 1:
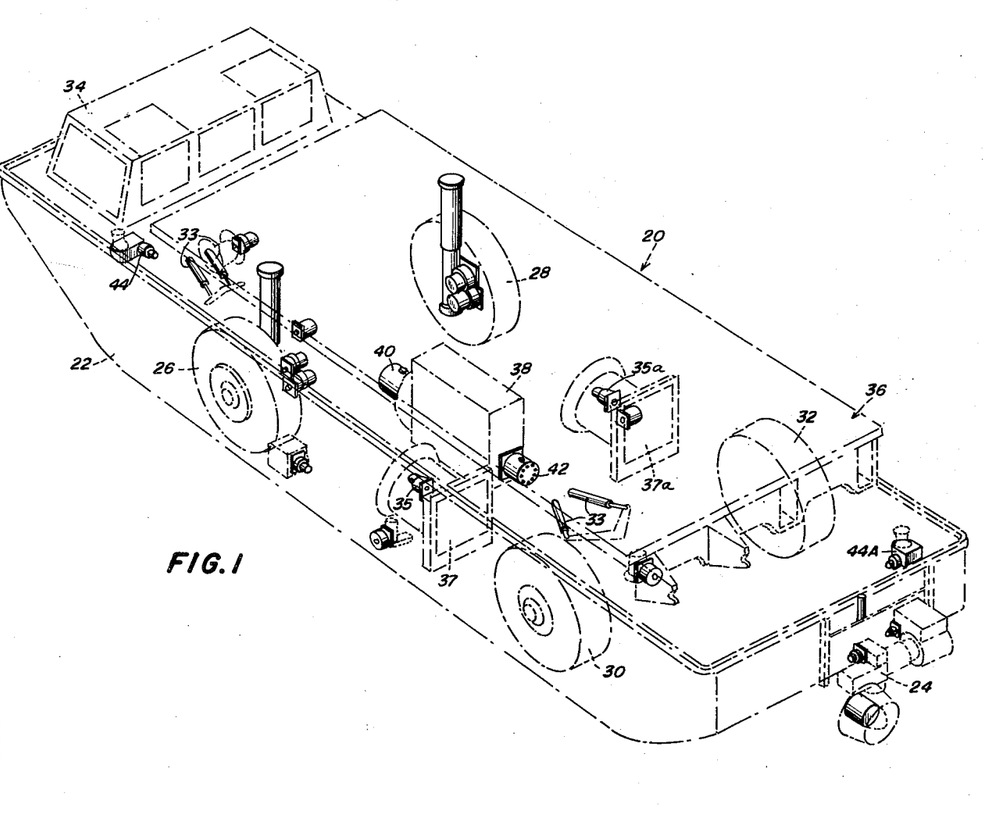
FIG. 1 is a perspective of a vehicle with portions broken away to disclose various hydraulic components.

Now, referring more specifically to the drawings, and in particular to FIG. 1, the numeral 20 indicates in general the amphibian vehicle within which the described embodiment of the hydrostatic system is intended to function. The body of the vehicle is water-buoyant and is comprised principally of a hull 22 to which a marine propulsion unit 24 is attached.

For land operations, a plurality of wheels 26, 28, 30, and 32 are supported at convenient points about the hull. The vehicle 20 is further equipped with a front cab 34 which houses the vehicle operators and the necessary operating controls. A hydraulically controlled bridge platform 36 is pivotally mounted about a vertical axis such that it can assume a position transverse to the vehicle's normal direction of travel. When water-borne the vehicle can thereby form a bridge (or a section thereof, when used in concert with similar vehicles) across a body of water.

The vehicle is powered by a prime power plant 38 which is operatively connected to a pair of high pressure hydrostatic pumps indicated generally at 40 and 42. Pump 40 is the source of power for operating the land and water propulsion means, and pump 42 operates the auxiliary equipment of the vehicle; namely, the steering and wheel retraction motors, the heat exchange fan motors 35 and 35a, mechanisms 33, the platform 36, and the capstan 44. Pump 42 is only important to this description in that it discloses a substantially complete hydraulically controlled vehicle, and that it cooperates with pump 40 by driving fan motor 35 of the fluid heat exchangers of the pump 40 circuitry, to cool oil passing through radiator core 37.

Figure 2:
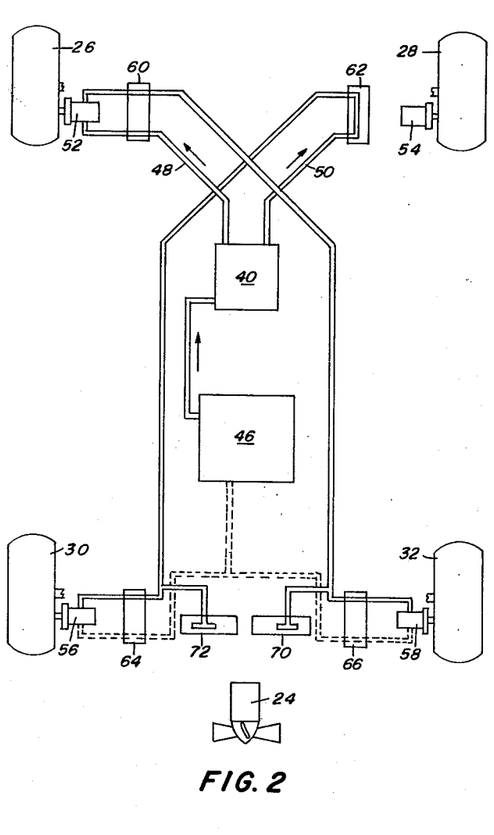
FIGS. 2 and 3 are diagrammatic views of the main fluid connections between the wheel and marine motors under different conditions of use.
Figure 3:
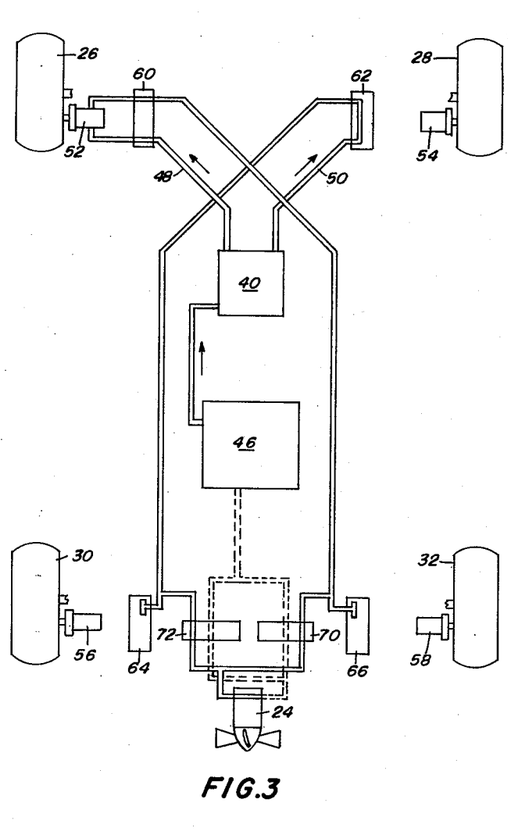

A simplified version of the manner in which fluid connections are made between pump 40 and the wheels 26-32 can best be seen in FIGS. 2 and 3. Pump 40 has two principal fluid output lines 48 and 50 leading first to two front ground engaging wheels 26 and 28, and subsequently to the rear wheels 30 and 32. The wheels have respectively associated therewith, wheel driving units 52, 54, 56 and 58 and, respectively controlling the fluid inputs to each of the driving units are slide valves 60, 62, 64 and 66. Another pair of valves, 70 and 72, control the fluid input of the motor of the water propulsion unit 24.

Conduit 48, FIG. 2, shows the fluid flow when a four-wheel drive is selected and line 50 shows two-wheel drive. In four-wheel drive, valve 60 permits fluid flow to wheel drive unit 52 and consequently wheel 26 is driven. After wheel 26 absorbs its power requirements, the fluid is passed to the diagonal wheel 32 where valve 66 allows flow to wheel drive unit 58 and thereafter the fluid is returned to reservoir 46. Through conventional connections, valve 60 is operated in unison with valve 62, and valve 64 is operated in unison with valve 66. Return flow is shown in dotted lines. When following the fluid flow of conduits 48 and 50 in FIGS. 2 and 3, it should be understood that the flows are disclosed independently. In other words, two different types of operation are shown in both FIG. 2 and FIG. 3 by each of the conduits.

In four-wheel drive, the prime drive pump 40 delivers its power first to the front wheel drive system and power is absorbed up to the maximum amount that can be transmitted by the tires to the ground. The remaining power in the fluid is then passed on through the control valves 60 and 62 to the rear wheel drives where the balance of

4 power is utilized. This proportioning of load is completely automatic and is governed only by the ability of the tires of the driven wheel systems to transmit the received power to the ground. In the event the front wheel systems spin out, the complete power output of the pump 40 will be transmitted to the rear drive systems. However, the rear drive systems will not receive power until such time as the front drive systems have exceeded their ability to transmit power to the ground. This is due to the fact that the front drive system motors have exactly the same displacement, or require the same amount of fluid per revolution of the motors, as the the rear drive motors. As in most hydraulic motors, there is, in the motors of this invention, a leakage of fluid internally. This leakage is returned directly to tank through conventional drain lines. This leakage loss may amount to two or three percent of the fluid delivered to the front motor assemblies and, consequently, the fluid delivered to the rear motors will be two or three percent less than that required for maintaining the same speed as the front wheel motors. As long as all wheels have 100% traction, it is obvious that the rear wheels will turn at the same speed as the front wheels and, consequently, will not be contributing any driving force. However, as soon as low traction terrain is encountered and the front wheels slip, sufficient oil will be transmitted to the rear wheels causing them to automatically absorb their proportion of the load. Therefore, the most desirable form of four-wheel drive is accomplished.

As previously stated, the flow of fluid through line 50 of FIG. 2 discloses the two-wheel drive system. In this instance valves 60 and 62 merely block fluid flow to the front wheel drive unit 26 and 28 and send it directly to the rear wheels.

Fluid flow in a marine environment can be seen by referring to FIG. 3. Here, there are two situations of use. First, where a beach boost drive assist is desired from the front wheels, and secondly where full power is desired at water propulsion unit 24.

The flow depicted by output 48 depicts the first situation, and the flow in output 50 depicts the second. In actual operation, each situation would have the flow in 48 the same as that in 50, and vice versa. Valve 60 routes the fluid to its associated wheel drive unit and then sends it directly to water propulsion unit 24. Valves 66 and 64 stop flow to the rear wheels 30 and 32 and render them inoperative. Described hereinafter is the circuitry which enables the water propulsion unit 24 to utilize the power supplied by both outputs and return the fluid to tank (reservoir 46).

The second situation of use is seen by following flow in line 50. Here valves 60 and 62, controlling fluid to each front wheel drive unit, block fluid flow thereto and route it directly to motor 24 through valves 70 and 72. The circuitry for combining these separate flows for use by motor 24 is also described more fully hereinafter.

Figures 4, 5:
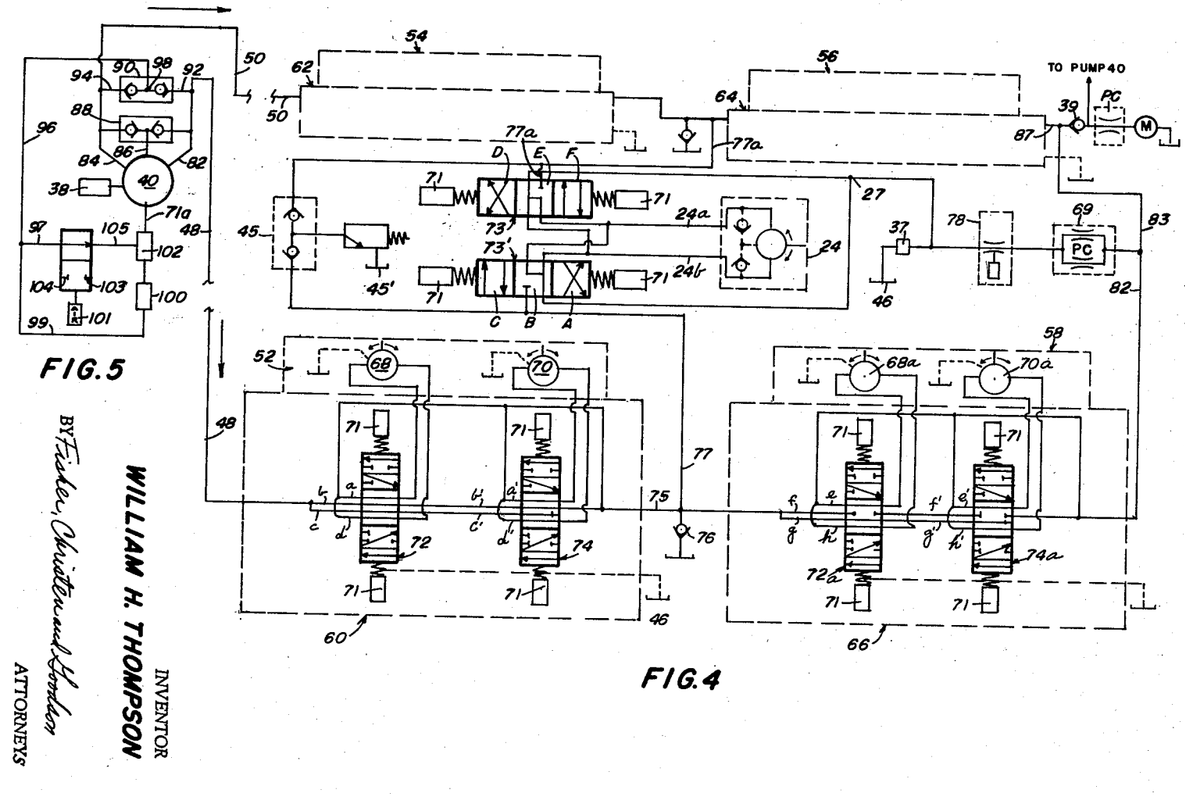
FIG. 4 is a schematic of the fluid control system.
FIG. 5 is a schematic of the main pump and associated control elements.

The above operations are best understood by referring to the partially detailed schematic of FIG. 4. The details of motor assemblies 54 and 56, and valve assemblies 62 and 64 have been blocked for simplicity because, for practical purposes, they are operatively identical to the motor assemblies 52 and 58, and valve assemblies 60 and 66, respectively. Note that in the schematic of FIG. 4, the system for controlling and driving wheels 26 and 32 are shown adjacent each other. Of course, their actual physical relationship is criss-cross, as shown in FIGS. 1 through 3.

The wheel-driving motor assembly 52 is comprised basically of two fluid motors, 68 and 70. The motors have different displacement characteristics, and fluid flows thereto are respectively controlled by slide valves 72 and 74 of control valve assembly 60. Motors, identical to 68 and 70, are provided for each of the other wheels. In wheel driving motor assembly 58, such motors are labeled as 68a and 70a.

Valves 72 and 74 have counterpart valves as assembly 62 (the other front wheel) which work in unison therewith. A description of the power flow for wheel 26 (elements 52 and 60), taken in conjunction with the flow diagrams of FIGS. 2 and 3, will suffice for a clear understanding of the operation of wheel 28 (elements 54 and 62).

Likewise, from a description of the functioning of the controls for wheel 32 (elements 58 and 60), the operation of control mechanism for wheel 30 (elements 56 and 64) will be apparent. Slide valves 72a and 74a of valve assembly 66 are basically similar to valves 72 and 74, except that theirs are of a center block type. Note in FIG. 4 that fluid from line 48 (line $b$) passes through the valves 72 and 74 when it is centered, but in valves 72a and 74a fluid is blocked (see lines $f$, $f'$, $g$ and $g'$) when they are centered.

The slide valves for all wheels and to the water propulsion system can be of the type disclosed in U.S. Patent 2,951,505 issued to Richard C. Hare on September 6, 1960. Their general function is to control the flow from lines 48 and 50 to the respective motor assemblies or to pass the flow straight through to the water propulsion unit.

Valve position is controlled through a conventional operator-controlled air or electric operated solenoid 71. The particular means for changing valve position are operator-controlled and as such form no part of this invention.

Prior to detailing fluid flow to and from the wheel drive motors 68 and 70, the effect and purpose of these motors will be explained.

Various speed ranges for the vehicle are established by selecting varying combinations of wheel drive motors 68 and 70, and their counterparts in the other wheel assemblies, and combining them with mechanical reduction means. Assuming that wheel drive motor 68 is the larger and, for example, has a displacement, and consequently a torque output 1.6 times as great as the smaller wheel drive motor 70, there are various ratios of outputs available. The selected ratio would, of course hold throughout all four of the wheel drive systems of a particular vehicle. When both motors are used together, the torque output (the sum) is 2.6 in relative value. Therefore, combinations of output values of 2.6 (both motors), 1.6 (only motor 68), 1.0 (only motor 70), and .6 (motor 68 in opposition to motor 70) are obtainable. Because this is a geometric progression, it also means that in each speed range selected the vehicle will have the same maximum horsepower output. Consequently, there is maximum vehicle horsepower available in any of the selected speed ranges.

The speed range of the hydraulic wheel drive described above is increased by incorporating therewith a two speed mechanical transmission at the output of the wheel motors. Thus there is a geometric progression from 2.6 to 1.6 to 1 to .6 and a shift in the mechanical transmission to the next higher speed range at a multiple of 2.6, 1.6, 1.0, and finally .6. Speeds up to 35 miles per hour are readily obtained in this manner.

Figure 9:
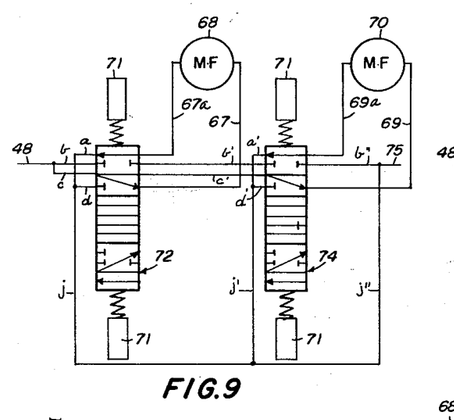
FIGS. 9 through 13 are diagrammatic showings of the wheel valve assemblies during various selected operation conditions.

FIGS. 9 through 13 diagrammatically show the hydraulic speed variation by showing the combinations of motors capable of selection. FIG. 9 shows the valve position in the low, or first speed range. In this instance fluid from line 48 is directed to valve 72 through lines $b$ and $c$. Line $b$ is blocked by valve 72 so that no flow beyond this point occurs. Line $c$ connects with two paths within the valve, one of which connects to line 67 which in turn delivers fluid to motor 68. The other line within the valve directs fluid through valve 72 to line $c'$ and then on to valve 74. As with the line $c$ in valve 72, line $c'$ indexes with two paths through valve 74, one connecting with line 69 which delivers fluid to motor 70, the other connecting to a blocked passage within valve 74, thus preventing loss of fluid from the valve through line $c'$. The fluid motors 68 and 70 are thus connected in parallel to the power source. Fluid is returned from motor 68 through line 67a through valve 72 into line $a$ which connects with line $d$ and line $j$. Line $d$ is blocked by the valve in this position. Likewise, motor 70 returns its fluid through line 69a through valve 74 into line $a'$ which in turn is connected to line $d'$ and line $j'$. As in valve 72, line $d'$ is blocked by valve 74 in this position. The return fluid is then carried through lines $j$ and $j'$ into junction with $j''$ and thence to line 75, which connects to valve 66, which controls the right rear drive assembly.

Figure 10:
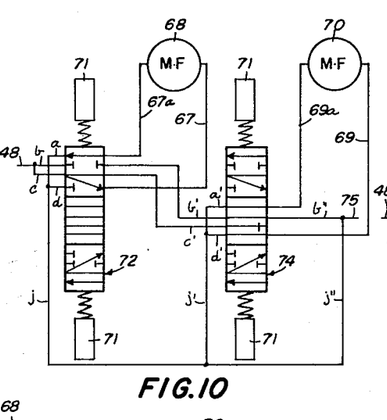

FIGURE 10 shows the valve position in the mid or second range wherein only the large motor is being driven. As in the case shown in FIGURE 9, line 48 delivers fluid to lines $b$ and $c$ of valve 72 and through the valve to motor 68 through line 67. The fluid returning from motor 68 returns from line 67a through valve 72 to line $a$ and junctions with lines $j$ and $d$. Fluid is blocked in valve 72 from passing through line $b$ to line $b'$ but is allowed to pass through line $c'$ to valve 74. $c'$ is now blocked within valve 74, however, so that no fluid is lost from the valve at this point. Motor 70 is allowed to idle by connecting its fluid lines 69 and 69a through valve 74 to lines $a'$ and $d'$ junctioning with $j'$. Thus, the fluid is allowed to circulate in a loop with no power being delivered by motor 70. Lines $j$ and $j'$ junction with $j''$ and it in turn junctions with line 75 which delivers fluid to valvebank 66.

Figure 11:
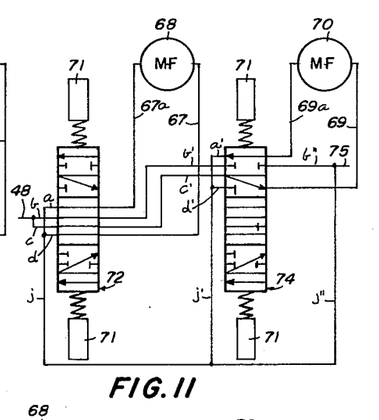

FIG. 11 shows the transmission in high or third speed range in which only the small motor 70 is driven. Fluid is delivered to the valvebank by line 48 and to valve section 72 by lines $b$ and $c$ which index with ports within the valve allowing fluid to flow through both lines through $b'$ and $c'$ to valve 74. No fluid is delivered by valve 72 to motor 68 so that all of the fluid delivered by line 48 is delivered to valve 74. Motor 68 is allowed to free wheel by the connection of its lines 67 and 67a through valve 72 to lines $a$ and $d$ in junction with line $j$. The fluid delivered by a line $b'$ to valve 74 is blocked within the valve so that no fluid is lost through this line. The fluid delivered by lines $c'$ is delivered to line 69 which in turn delivers fluid to motor 70. The alternate path for fluid from $c'$ in valve 74 is blocked. Return flow from motor 70 is delivered to valve 74 through line 69a through valve 74 to $a'$ which junctions with $d'$ and $j'$. Fluid from $j'$ is delivered to $j''$ which in turn delivers fluid to line 75.

Figure 12:
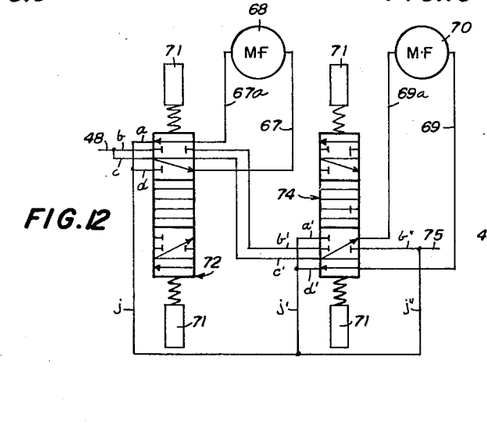

FIG. 12 shows overdrive or fourth speed range in which large motor 68 is driven forward as a motor and small motor 70 has its fluid connections arranged in the opposite direction so that it becomes a pump; thus, adding its fluid to the fluid supplied from the prime power source through line 48. Motor 68 receives fluid from the prime power source through line 48 in the same manner as previously desecribed for FIGS. 9 and 10. In addition to the fluid supplied through line 48 to motor 68, additional fluid is supplied by motor 70 which is now operating as a pump. The direction of flow of fluid through motor 70 is still the same, that is, inlet from line 69 and outlet through line 69a. Now, however, because valve 74 has been shifted to a reverse position, the fluid delivered from line 69a is delivered to line $c'$ and back to valve 72. The inlet fluid for line 69 is being drawn through valve 74 from line $d'$ which junctions with $j'$. The fluid delivered to valve 72 from $c'$ is directed to line 67 and combined with that from $c$, thus adding to the fluid supplied through line 48.

Figure 13:
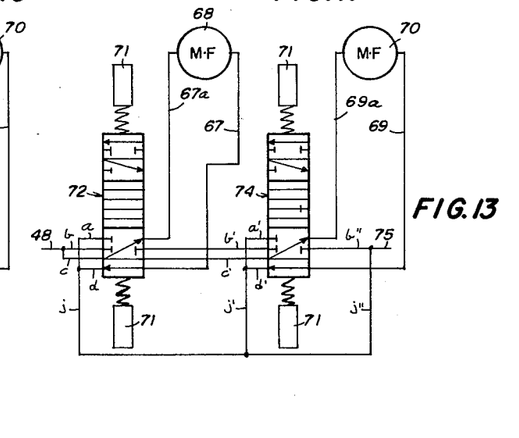

FIG. 13 shows reverse. The fluid connections here are essentially the same as those shown in FIG. 9 except that fluid is supplied to lines 67a and 69a by virtue of the position of the control valves, causing the motors to run in the reverse direction.

Valve 45 is a double inlet check valve with its outlet connected to a relief valve 45'. The purpose of valve 45 is to relieve any extra pressure build-up between the front wheel motors and the rear wheel motors when operating in four-wheel drive with the front wheel on the outside of a turn. The outside wheel will drive faster than the inside and, consequently, will act as a pump in relation to the rear wheel. This will cause an increase in pressure between the two wheels which is relieved by valves 45 and 46.

FIG. 4 shows that valve positioning when all the wheel drive motors are by-passed, and full fluid output in lines 48 and 50 is transmitted toward the water propulsion system via lines 77 and 77a. FIG. 4 also shows that condition wherein fluid flow is blocked at directional control valve 73'.

Valve 73' is a three-position device having positions A, B, and C, and valve 73 is a three-position device having positions D, E, and F.

The valves are moved in unison by their associated air cylinders or electric solenoids to positions wherein A and D are respectively disposed opposite lines 77' and 77a' respectively transmitting all fluid to line 24b so as to drive motor 24 in a first direction, or to where C and F are respectively disposed opposite lines 77' and 77a' to transmit all fluid to line 24a driving motor 24 in the other direction. In other words, valves 73 and 73' permit full output to be applied to motor 24 in either direction. In each event, the fluid flows meet a common point 27 after driving motor 24.

As previously stated, another important objective of the invention is its ability to pull itself up by its own boot straps when leaving bodies of water. This results from the ability of the hydraulic system to deliver power to the front wheels 26 and 28 at the same time that it is delivering power to the water propulsion unit and divide this power according to the load or power absorption ability of each drive system.

Power division for this purpose is accomplished in the manner similar to that in the four-wheel drive. The fluid is passed first through the front wheel drive system where the power is absorbed up to the maximum capability of the tires to transmit power to the ground and then passed to the water propulsion unit where the balance of power is absorbed. At this time, the valves of systems 64 and 66 are in their block center position. If the vehicle is still afloat and the front wheels are not meeting resistance there will be no power absorbed by the front wheels, causing the water propulsion to receive nearly 100% of the output of the primary drive source through valves 70 and 72. However, as the wheels begin to bear weight and absorb power, the water propulsion unit will receive a proportionately less amount of the power delivered by the primary drive pump until the vehicle is completely land borne and the water propulsion unit is receiving no power. This power division is completely automatic and requires no special operating technique or attention by the operator, other than a simple selection of valve positioning.

The system includes provisions for a method of dynamic braking to reduce the wear on the main braking system. This is especially important for operation during long down grades. This dynamic braking is accomplished by restricting the return of fluid from lines 83 and 85 (FIG. 4) to tank, and thereby build a back pressure against the wheel drive motors. It will be noted that lines 83 and 85 lead from the rear wheel drive systems when flow is restricted, the motors become pumps, and become pressure generators rather than pressure absorbers. The energy absorbed from the wheels in generating this pressure is dissipated across a dynamic brake restrictor valve 73. The amount of power absorbed will depend upon the amount of restriction imposed by the restrictor valve and this restriction can be conventionally modulated through a foot pedal in the operator's cab 34.

The potential energy of the pressurized fluid is converted to heat by the dynamic brake valve 73 and it is necessary for proper operation to remove this heat by the heat exchanger 37. Exchanger 37 is a conventional oil cooler and is inserted in the hydraulic system between the restrictor braking valve and tank. The exchanger's function is to remove the heat generated and, therefore, absorb the energy produced during dynamic braking. It also serves to maintain hydraulic system temperature during normal operation. A pressure compensating flow control valve 69 continuously limits the fluid flow from the hydraulic motors to a flow rate equal to that occurring at maximum motor speed. A further increase in flow rate causes valve 69 to restrict itself in a manner well known to the art. This prevents the braking from damaging the motor or vehicle due to overspeeding as would be particularly present during travel over extended down grades.

Air is driven over the oil cooler exchanger 37 by hydraulically driven axial blower 35 shown in the diagrammatic layout of FIG. 1. As previously mentioned, the axial blower 35 receives its fluid power from the auxiliary drive pump 42. Therefore, the cooling capacity of the oil cooler heat exchanger 37 is proportioned to the speed of operation of the blower and the blower output is proportioned to the diesel engine speed. During dynamic braking, the engine is at low idle, and maximum cooling is required from the cooling system. This is by virtue of the fact that a fixed displacement pump and motor are used for the auxiliary system thus making the blower's speed proportionate to the engine speed. To provide additional hydraulic fluid to the motor which drives blower 35 during these conditions, lines 83 and 85 are connected to the blower 35 via line 87. This results in additional flow to the motor which drives blower 35 during dynamic braking. Also, the additional advantage of the blower utilizing some of this excess energy created during dynamic braking is obtained. To prevent this fan motor from over speeding, a flow control 39 is inserted in this line to limit the amount of fluid delivered to the fan motor. Compensator 69, of course, is automatic and not under the control of the vehicle operator.

FIG. 5 diagrammatically discloses the pump 40 which is driven by engine 38 and which is the source of pressure in lines 48 and 50. The pump is of a variable volume split flow type and can be of the type more fully described in United States Patent No. 2,997,956, issued August 29, 1961. In such a pump, variable flow is accomplished by axial movement of a plunger type member. Here, such axial movement is obtained in member 71a (FIGS. 5 and 7) hydraulically through apparatus hereinafter described.

Pump 40 supplies two equal independent outputs 82 and 84, and a third output 86 which automatically proportionately directs itself to either of the outputs 82 and 84. This is accomplished through a double check-ball device 88. Output 82 merges with valve input 48, and output 84 merges with valve input 50.

The checkball device 88 provides the vehicle with a limited slip differential action. The differential ratio is a function of the volume delivered through lines 82 and 84, and the volume delivered through line 86. In the pump shown, six pistons can be delivering through each conduit 82 and 84, and two pistons delivering through conduit 86. Thus, if all the fluid output of 86 were added to 82, there would be a ratio of 8 to 6 between outputs 82 and 84, or a differential ratio of 33%. This ratio cannot be exceeded even if both wheels on one output were to lose traction.

The limited slip feature provided by device 88 prevents the complete loss of power in one output when the other loses traction. The division of the fluid between outputs 82 and 84 is completely automatic, depending only upon the relationship of the pressure in these two outputs.

Disposed between lines 48 and 50 is a ball-check accumulator 90 having a conduit 92 in communication with output 82 (48) and another conduit 94 in communication with output 84 (50). Thus, the valve ball check accumulator 90 (FIG. 8) can sense pressure variances in either of the independent fluid pressure lines 48 and 50. A connecting line 96 leads from the chamber 98 (between ball-checks) and directs its sensings to a compensator element 100, and then to a maximum horsepower control unit 102. The control unit 102 is rendered inoperative by a two-position valve 104 during the period of marine propulsion when all horsepower available is desired. Section 103 blocks pressure to line 105 and the other section transmits it.

As previously stated, the invention provides means for the hydraulic system to match the output of the prime power source. An internal combustion engine has a torque output curve that increases with increasing engine speed to a maximum and then decreases somewhat with further increased engine speed. On the other hand, the torque absorption capacity of a hydraulic pump is a function only of the displacement of fluid per revolution of the pump, and the pressure at which the pump is operating. Therefore, the r.p.m. of the pump does not affect its torque absorption capability. Consequently, it is obvious that a pump designed to handle maximum torque output of the engine will have a capacity to stall the engine when the engine is not running at maximum torque output; i.e., at part throttle conditions. Presently, this difficulty is commonly overcome by simply connecting the engine throttle setting with a cam controlling the displacement of the hydraulic pump. This permits the engine to run at part throttle, but does not allow the pump to deliver full volume. Thus, the full output of the engine is not utilized at part throttle conditions.

Another expedient, although less efficient, is to simply run the engine at maximum torque output speed at all times and control the hydraulic system through pump displacement alone while leaving engine speed constant. Of course, when encountering very light loads, fuel is wasted by running the engine at these high speeds.

The system disclosed herein differs from the above two methods by controlling the maximum pressure level at which the pump delivers full displacement under part throttle conditions. This is best understood by referring to the pump displacement control shown in FIG. 7. Basically, when the vehicle is operating at very low pressures and at a part throttle setting, vehicle speeds proportionate only to the throttle setting is obtained; that is, at half throttle setting substantially half vehicle speeds are obtained. When torque requirements are increased, the hydraulic system's pressure reaches the setting pressure of the displacement control (hereinafter described). The displacement control is activated and gradually reduces the displacement of the pump as the pressure further increases so that the torque absorption capability of the pump remains constant. In the instant emobdiment, the vehicle will reduce its speed due to the reduced displacement of the hydraulic pumps. When the operator notes that the vehicle is lagging, he increases his throttle setting which, of course, will increase the torque output of the engine and increase the torque absorption of the pump concurrently. The vehicle then accelerates to some new equilibrium point with a higher torque absorption.

As the engine is permitted to operate at the same speed, while the torque required by the drive increases, the displacement control will cause the pump to follow the constant torque absorption curve to its maximum output pressure. Beyond that, any further increase in drive torque requirement will stall the vehicle. In other words, a vehicle stall condition is established at maximum drive torque.

Figures 7, 8:
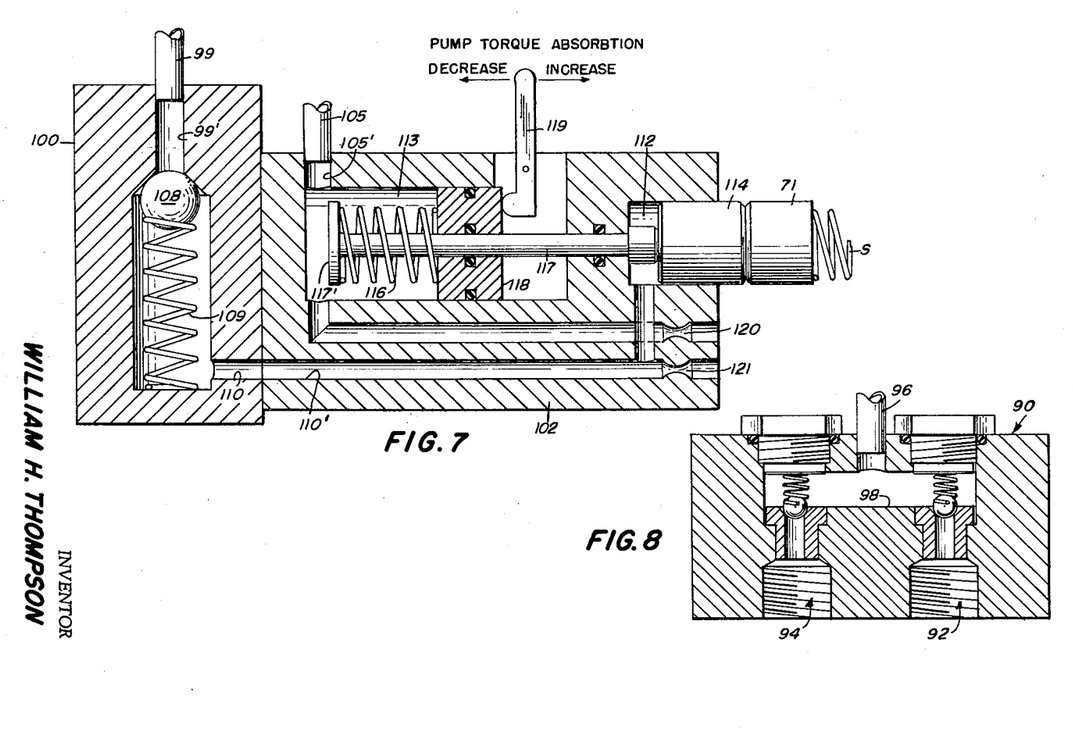
FIG. 7 is a sectional view of a valve assembly.
FIG. 8 is a sectional view of another valve assembly.

The mechanical structure for accomplishing the above is now described. The compensating element 100 and the horsepower control element 102 are best seen in FIG. 7. Element 100 includes a ball seat chamber 106 in which a spring biased ball 108 is housed. Pressure sensings from line 99 unseats ball 108 and pressure is transmitted therefrom to element 102 via channel 110. The element 102 includes a channel 110' in communication with channel 110. Channel 110' is in communication with the pressure chamber 112 which slidably receives a spring urged plunger 114.

Plunger 114 is of a floating type and is operatively disposed between an elongated stem 117 and member 71 of the pump. Stem 117 has an enlarged disc 117' at its outer end and slidably received along its length is an annular plunger 118. A coil spring 116 is disposed between disc 117' and plunger 118. Pressure in chamber 112 urges plunger 114 outwardly (to the right). Pressure in line 105' likewise tends to push plunger 114 outwardly via stem 117. The compression in spring 116 is determined by the position of plunger 118 as controlled by the pivot link 119. As system pressure increases to a point sufficient to overcome spring 116, plunger 114 moves to the right (as seen in FIG. 7) and actuates the pump displacement control 71. This movement reduces the pump displacement which keeps the pump torque absorption constant with the increase in system pressure. When system pressure reaches its designed limit, the pressure acting through passages 99 and 99' will unseat ball 108 and act directly against 114 causing the pump to reduce its displacement to substantially zero. At this condition, there will be a slight displacement but only enough to make up for leakage in the system. When pressure is reduced ball 108 reseats and pressure in chamber 112 decays through orifice 121 allowing piston 114 to return. Spring 116 returns stem 117 to the left as pressure in chamber 113 decays through orifice 120. A spring S within the pump causes the member 71 to maintain engagement with plunger 114. The movement of 71, of course, increases pump displacement in proportion to the reduction in system pressure, and maintains the torque absorption of the pump constant. Link 119 is operatively and proportionately connected to the engine throttle setting by conventional apparatus. Link 119 could be replaced by hydraulic sensing devices, mechanical fly-ball governors or the like. The orifices 120 and 121 are diagrammatic showings indicating the exit path of the hydraulic fluid in the piston chambers.

Figures 6, 6A:
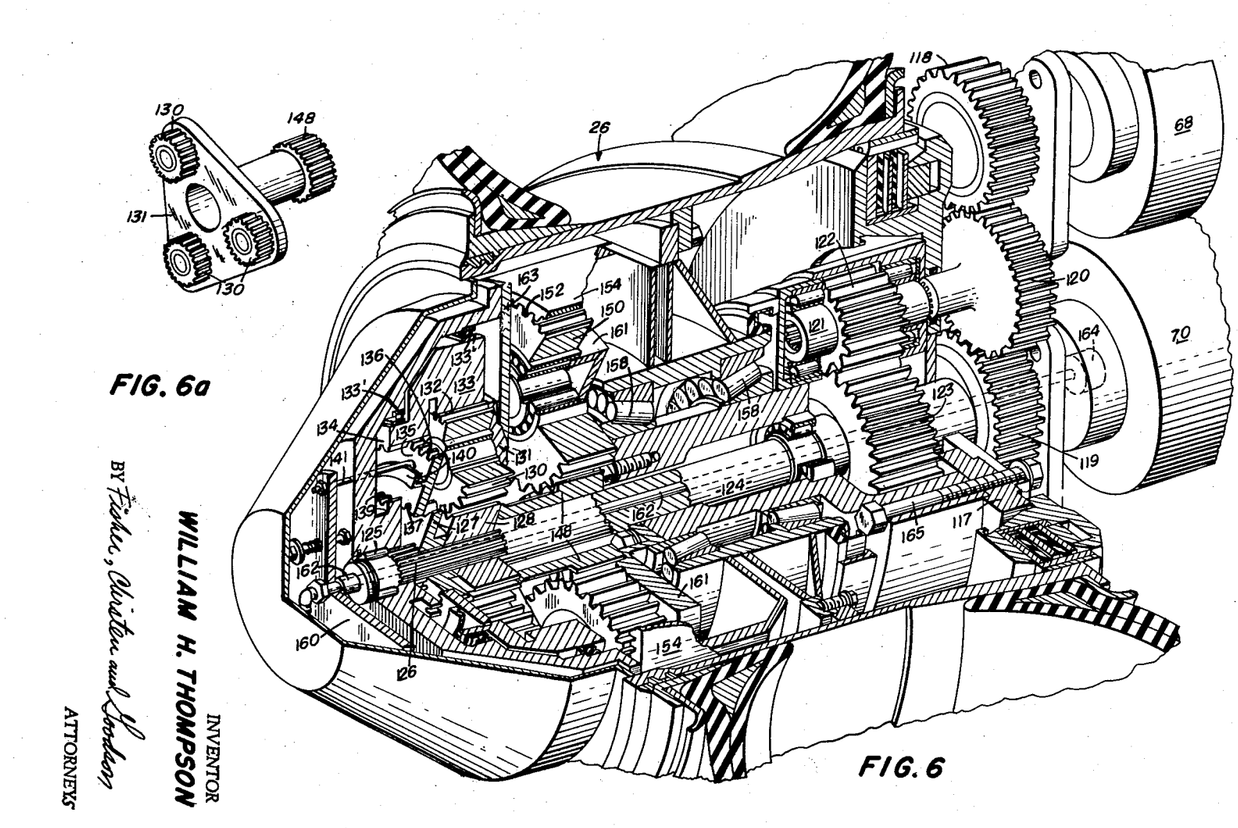
FIG. 6 is an isometric view of a wheel assembly with parts broken away.
FIG. 6a is an isometric view of a portion of FIG. 6.

A cut-a-way showing of wheel 26 is shown in FIG. 6 which enables the hydraulic speed ranges hereinbefore described to be mechanically multiplied into upper and lower speed ranges. This mechanical reduction is accomplished without losing any of the benefits of the hydraulic reductions. The structure of wheeels 28, 30, and 32 is the same as that shown for wheel 26.

The motors 68 and 70 are mounted to the wheel housing 217, 218, and 219, respectively. Disposed between gears 218 and 219 is a center gear 120 having a center quill 121 extending outwardly therefrom. About quill 121 is a gear 122 in driving engagement with a larger gear 123.

Gear 123 has a hollow elongated quill 124 extending therefrom, and terminating in a bearing support 125 which is part of housing 117. Quill 124 is splined near bearing 125 at 126. Spline 126 drivingly engages a gear 128 which is equipped with an offset portion 127. A plurality of planetary gears 130, rotatably mounted about a triangular plate 131, are in engagement with inner teeth 132 of an annular rotatably mounted reaction gear 133. Reaction gear 133 has a further section of inner teeth 134 for a purpose hereinafter described.

In constant engagement with teeth 134 is a ring gear 135 having outer teeth 136 and inner teeth 137. Disposed near bearing 125 and fixedly positioned with respect to housing 117, are a set of teeth 139 capable of meshing with teeth 137. The space defined between teeth 139 and 134 is just sufficient to receive the ring gear 135.

An annular catch 140 is affixed to the outer surface of ring gear 135 so as to receive an operating hook 141. A movement of hook 141 can therefore move ring gear 135 into engagement with teeth 139 and thereby lock reaction gear 133 to the housing. The ring gear 135 can also be moved to a neutral position between teeth 139 and gear section 127. Thirdly, the gear can be moved to a position wherein there is engagement between teeth 137 and 127, which causes reaction gear 133 to rotate with respect to the housing 117 on bearings 133'. In other words, gear 133 will rotate with shaft 124.

Inwardly extending from the triangular plate 131, which is mounted for rotation, is a hollow sleeve 146 terminating in a gear 148. Gear 148 (see FIG. 6a) is disposed opposite a plurality of planetary gears 150. Gears 150 are mounted for rotation between plates 161 and 163. Plates 161 and 163 are affixed to housing 117 and do not rotate. Spacer plates (not shown) in the voids between gears 150 are provided to connect the plates 161 and 163. Plate 131 receives its rotary motion from gears 130 when reaction gear 133 is stationary with respect to the wheel housing. Gears 150 are, at their outer edges, in engagement with the interior teeth 152 of a rim gear 154. The rim gear is firmly affixed to the rim of the tire which is free to rotate in relation to housing 117. Housing 117 is fixed to the supporting structure by bolts 165 and does not rotate. The rim gear assembly is supported to the drive assembly by way of bearings 158.

The mechanism for moving ring gear 135 to its various positions is quite simple. A plate 160, which is fixedly secured to a reciprocating rod 162, is received in the hollow center of quill 124, and is operated by an air cylinder 164. By selectively operating the air cylinder hook 141, the ring gear 135 can thus be caused to assume one of three positions. When the ring gear 135 is in engagement with teeth 139, it effectively ties the housing 117 to annular reaction gear 133 which prevents its rotation. The teeth of reaction gear 133 then provide a bearing for gears 130 and power is thus transmitted from quill 124 to rim gear 154 via gears 128, 130, 148 (via the quill 147 rotated by plate 131), and 150. An important reduction is thereby obtained between gears 130 and 148, and this position is "low speed."

When ring gear 135 is in engagement with teeth 127, the rotation in quill 124 is transmitted to annular reaction gear 133, and gear 133 is free to rotate. When this occurs, reaction gear 133 will rotate with gear 128 and offer no resistance to rotation in gears 130. Therefore, power from quill 124 is directed straight from gear 127 to gear 148 without reduction, and from there to planetary gears 150. This, of course, is the "high speed" range.

When ring gear 135 is in its neutral position (as shown in FIG. 6) reaction gear 133 does not provide any back pressure support, and the rotating elements are not connected to the wheel housing, and consequently no power is transmitted to rim gear 152 because quill 124 will merely rotate within quill 147.

In a general manner, while I have, in the above description, disclosed what I deem to be a practical and efficient embodiment of my invention, it should be well understood that I do not wish to be limited thereto, as there might be changes made in the arrangement, disposition, and form of the parts without departing from the principle of the present invention as comprehended within the scope of the accompanying claims.

I claim:

1. A hydrostatic transmission system for providing power to the driving means of an amphibious-land vehicle comprising in combination, a variable volume hydraulic pump having first and second power outputs, two front and two rear ground engaging wheels for driving said vehicle over land, valve control means for selectively routing said first output to one of said two front wheels and in series to one of said rear wheels furtherest therefrom, and second valve control means for selectively routing said second output to the other of said front wheels and in series to the other of said rear wheels.

2. A hydrostatic transmission system for providing power to the driving means of an amphibious-land vehicle comprising in combination, a variable volume hydraulic pump having first and second power outputs, two front and two rear ground engaging wheels for driving said vehicle over land, and a water propulsion motor for driving said vehicle in water, valve control means having a first position selectively routing said first output to one of said two front wheels and to one of said rear wheels furtherest therefrom, and second valve control means for selectively routing said second output to the other of said front wheels and in series to the other of said rear wheels, said first and second valve control means having alternate positions selectively diverting said first and second outputs from said front wheels to said water propulsion motor, first means to detect that output carrying the greater load, second means for varying the output of said pump, and third means responsive to the detected pressure of said first means and operatively connected to said second means, and a cut-off means for rendering said third means inoperative when said valve is in its second position.

3. A hydrostatic transmission system for providing power to the driving means of an amphibian vehicle comprising a variable volume hydraulic pump having first and second independent power outputs, a plurality of ground engaging members for driving said vehicle over land, a water propulsion plant for driving said vehicle in water, a multi-position valving means for selectively routing said first and second outputs respectively to said ground engaging members, or alternatively to said water propulsion plant, or partially to said ground engaging members and partially to said water propulsion plant, a plurality of motors of different capacities for driving said ground engaging members, and said valving means having a position for selectively causing either one or all of said motors for each of said ground engaging members to receive one of said power outputs.

4. A hydrostatic transmission system for providing power to the driving means of a vehicle comprising in combination, a hydraulic pump having a plurality of outputs, a plurality of ground engaging wheels supporting said vehicle, first and second motors of different displacements respectively connected to each of said outputs, valve means for selectively causing either one or both of said motors to deliver power to its associated wheel, a gear train connecting said power outputs to each of said wheels, selective mechanical reduction ratios in said train, and operator-controlled means for selecting one of said ratios whereby the number of speeds for said wheels includes all combinations of said ratios with said selected hydraulic motors.

5. A hydrostatic transmission system for providing power to the driving means of an amphibious-land vehicle comprising in combination, a variable volume hydraulic pump having first and second power outputs, two front and two rear ground engaging wheels mounted on said vehicle, two motors connected to each of said wheels and driven by said pump, valve control means for selectively routing said first and second outputs to said motors of said two front ground engaging members and in series with the motors of said rear wheels, means joining said first and second outputs after they leave said rear wheels, a common fluid reservoir between the return of said outputs and said pump, a fluid restrictor across said return for placing back pressure on said motors, a heat dispersal unit for eliminating heat caused by said restrictor, and means for utilizing said back pressure to drive said unit.

6. A hydrostatic transmission system for providing power to a plurality of loads comprising in combination, a variable volume hydraulic pump having first and second independent power outputs, an engine for driving said pump, a first load connected to said first output and a second load connected to said second output, a fluid passageway communicating said first and second outputs, an accumulator disposed along said passageway, first means permitting a portion of fluid to enter said accumulator from either of said outputs when the pressure in said outputs exceeds a predetermined level, second means for varying the output of said pump, and third means responsive to said portion of fluid to operate said second means.

7. The system according to claim 6 wherein there is a control for varying the output of said engine, and said control includes means for selecting said predetermined level of pressure.

8. A hydrostatic transmission for a vehicle comprising in combination a variable volume hydraulic pump, a plurality of wheels supporting said vehicle, a hydraulic motor for powering each of said wheels, a conduit system for communicating fluid power from said pump to said motors, a common fluid reservoir, a common fluid return line communicating each of said motors to said reservoir, a fluid restrictor across said return for placing back pressures on motor in those instances when the pressure in said motors exceeds that in said system, a unit for cooling fluid in said reservoir, said unit including a blower motor and an independent source of pressure for driving said blower motor, means for adding the fluid power from said return to said source when the back pressure caused by said restrictor exceeds a predetermined level.

References Cited by the Examiner
UNITED STATES PATENTS

| | | | |
|---|---|---|---|
| 1,153,930 | 9/15 | Keene | 180—44 |
| 1,900,050 | 3/33 | Ernst | 60—97 X |
| 2,042,247 | 5/36 | Blood | 60—52 |
| 2,361,098 | 10/44 | Higby. | |
| 2,418,123 | 4/47 | Joy | 180—66 |
| 2,486,049 | 10/49 | Miller | 115—34 |
| 2,645,298 | 7/53 | Hawkins et al. | 180—66 |
| 2,733,771 | 2/56 | Sullivan | 180—66 |
| 2,774,436 | 12/56 | Ferris | 60—19 X |
| 2,797,551 | 7/57 | Adams et al. | 60—97 |
| 2,908,241 | 10/59 | Todd | 115—1 |
| 2,953,212 | 9/60 | Lee | 180—44 |

MILTON BUCHLER, *Primary Examiner.*
ANDREW H. FARRELL, *Examiner.*